April 8, 1930.  W. A. RIDDELL  1,754,202
PHOTOGRAPHIC SHUTTER BLADE ACTUATING MECHANISM
Filed Feb. 15, 1929
FIG. 1.
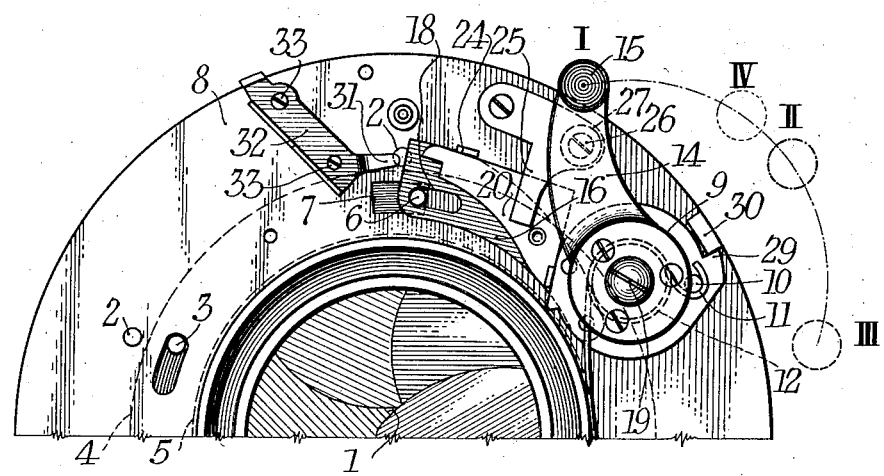
FIG. 2.
FIG. 4.
FIG. 3.
FIG. 5.
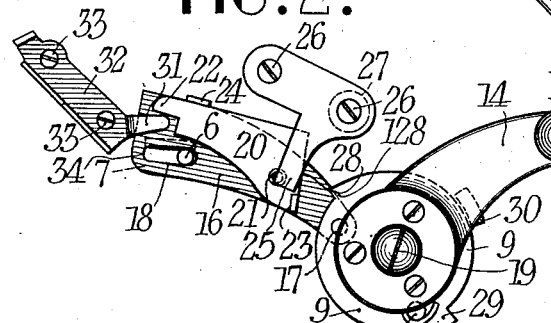
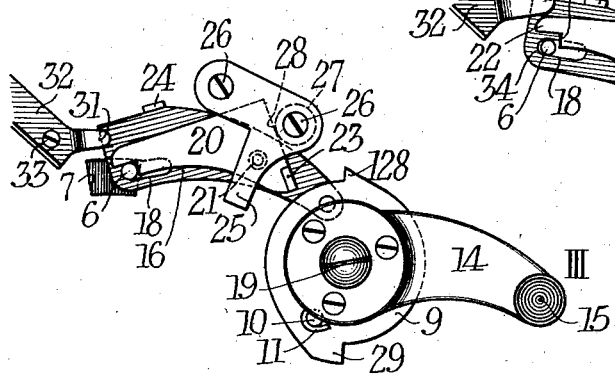
William A. Riddell,
INVENTOR,
BY
ATTORNEYS.

Patented Apr. 8, 1930

1,754,202

UNITED STATES PATENT OFFICE

WILLIAM A. RIDDELL, OF ROCHESTER, NEW YORK, ASSIGNOR TO EASTMAN KODAK COMPANY, OF ROCHESTER, NEW YORK, A CORPORATION OF NEW YORK

PHOTOGRAPHIC-SHUTTER BLADE-ACTUATING MECHANISM

Application filed February 15, 1929. Serial No. 340,239.

This invention relates to photography and more particularly to photographic shutters. One object of my invention is to provide a shutter blade-operating mechanism which is capable of operating at an excessively high speed. Another object of my invention is to provide a connection between the shutter blades and the master member which does not depend upon springs for its operation. Another object of my invention is to provide a shutter blade-driving mechanism operated through a latch which is positively moved into the desired position through the actuating of the shutter parts. Still another object of my invention is to provide a permanent connection between the shutter blade controller and the master member and to provide a means for altering the effective length of this connection so that the blades may be driven at one actuation of the connector and so that the blades may remain idle at another actuation thereof, and other objects will appear from the following specification, the novel features being particularly pointed out in the claims at the end thereof.

This invention is for an improvement over the shutter blade driving mechanism shown in my Patent 1,629,534 for photographic shutters, issued May 24, 1927. Since certain features of the present invention may be substantially the same as those shown in this patent, reference may be had to the patent for the structure of certain parts, such as the blade-operating mechanism, the shape of the blades etc.

Coming now to the drawings wherein like reference numerals denote like parts throughout,—

Fig. 1 is a fragmentary plan view of a shutter plate equipped with a blade operating mechanism constructed in accordance with and embodying a preferred form of my invention.

Fig. 2 is a fragmentary plan view of the blade-operating parts removed from the shutter in a different position from that shown in Fig. 1.

Fig. 3 is a view similar to Fig. 2 but with the parts in still a different position.

Fig. 4 is a perspective view of the connecting link between the shutter blade-operating mechanism and the master member with the latch mounted thereon, and Fig. 5 is a view similar to Figs. 2 and 3 but with the parts in still a different position.

In accordance with my invention, the shutter blades 1 may be pivotally mounted as upon studs 2 and may be provided with pins 3 engaging a shutter blade controller, such as a ring 4 which may oscillate about a tubular extension 5 on the shutter plate, or which may oscillate about a pin as shown in the patent above referred to.

It is not material what type of shutter controller is used nor the shape or number of the shutter blades, it being only necessary that the controller is actuated by oscillating a pin such as pin 6 in Fig. 1. This pin extends up through a slot 7 in the shutter plate 8 which carries parts of the shutter mechanism.

In order to open and close the shutter blades, this pin must be moved from the position shown in Fig. 1 to the left and then returned to the position shown to make an exposure.

However, in order to tension the master member which comprises a rotatable cam blade 9, a pin 10 thereon for holding one end 11 of a coil spring 12, the other end of which 13 rests against an annular member 5, it is necessary to turn the setting lever 14 by means of a handle 15 from the position shown at I to the position indicated at III.

In accomplishing this movement, there is a back and forth movement of the link 16 which is pivoted at 17 to the master member and which has a slot 18 embracing the stud 6. This occurs because the pin 17 moves from the position shown in Fig. 2 to the position shown in Fig. 3 past the center of rotation 19 of the master member. It is obvious, therefore, that one stroke of the link 16 must be idle with respect to the pin 6. This stroke is used to accomplish the setting of the master member.

A second stroke of the link 16 back and forth, as pin 17 moves while the master member is moving from the position shown in III to the position shown at I, is used to actuate the shutter leaves 1 through the movement of pin 6, which, as before described, is affixed to the blade controller. The following mechanism is used to accomplish this movement.

Referring to Fig. 4, a link 18 is provided with an aperture 17a through which pin 17 passes to the master member 9. A latch member 20 is pivoted at 21 to the link 16 and this pivot is arranged to exert a certain amount of friction between the latch and link, such as may be accomplished by slightly bowing the latch member 20 and drawing down the curve surface with the rivet. Member 20 is provided with a latch in the shape of a hook at 22 and there is an upstanding lug 23 at the opposite end of member 20 from the latch. Link 16 is provided with an upstanding lug 24 which is to limit the movement of member 20 in one direction.

On the shutter plate 8 there is provided a guiding lug 25, this lug being supported by a pair of screws 26, about one of which, as shown at 27, there is an enlarged shank, which, by striking the edge 28 of member 20, is adapted to turn the latch about its pivot 21 when the parts move to position III.

The latch is moved in an opposite direction about is pivot 21 when the lug 23 comes in contact with abutment 128 which is a part of the master member 9. This master member likewise carries a second abutment 29 adapted to engage a post 30 on plate 8 when the shutter is in a position of rest as indicated in Fig. 1.

A second guiding member 31 is provided, this guiding member consisting of a blade 32 attached to the shutter blade 8 by means of screws 33. The guiding member 31 is spaced from the pin 6 a distance sufficient to permit the latching member 22 to ride in between, as indicated at Fig. 3, and when in the position shown, for instance in Fig. 3 or 5, the latching end 22 lies between the pin 6 and the guiding member 31; the pin 6 is confined between the end 34 of the slot 18 and the edge 35 of the latching member.

The operation of the blade operating mechanism will now be described.

Starting with the shutter with the parts in the position shown in Fig. 1, in order to set the shutter, a setting lever 14 must be moved from the position shown at I to the position shown at III.

As the handle 15 is moved, the link 16 is moved back and forth idly with respect to pin 6. That is, pin 6 is not moved during this movement.

The lever 1 is moved to the position shown at II in which pins 17, pin 6, and the axis 19 of the setting lever will be substantially in a straight line. During this movement, it will be noticed that the latch 20 is moved so that the hook 22 engages one side of the guide 31 and, as the movement continues, pin 17 swings up past the pivot 19 of the master member until the setting lever reaches the position shown at III in which the master member is fully tensioned.

As it reaches the set position, the edge 28 of member 20 strikes abutment 27 and the latch member is swung about its position into the position shown in Fig. 3.

In making an exposure, the master member is released by mechanism not shown in this drawing, so that the link 16 is again actuated, and this time, since the latch has been moved to the position shown in Fig. 3, the pin 6 will be held between the end 34 of slot 18 and the face 35 of latch 20. In other words, the pin 6 will be moved with the link.

As the setting lever returns, link 16 first opens the shutter, then moving in a reverse direction permits the blades to close, and as the setting lever approaches the position shown at IV in Fig. 5, the abutment 128 strikes lug 23 of the setting lever 20 and turns member 20 about its pivot 21 so that as the end 22 passes the end 31 of the guide, and member 20 is swung again upwardly into the position shown in Fig. 1. In this position, of course, there may be a back and forth movement of link 16 (for setting the shutter) which will not affect the pin 6.

It should be noted with this construction that the operation of the connecting member between the setting lever and the shutter controller does not depend on springs. It has been found in high speed shutters that the operation of these parts is sometimes too rapid for springs to always act satisfactory.

For instance, in a shutter giving an actual 200th of a second exposure, the shutter blades may be opened in 2 or 3 thousandths of a second and may be closed in possibly 3 or 4 thousandths of a second. It can thus be seen that during the operation of exposure the connecting member between the master member and the shutter controller moves with great rapidity.

With a connector constructed in accordance with my present invention, the latch does not depend on springs but is positively moved into its idle position in which the shutter may be set and into its operative position in which the shutter leaves may be opened and closed by means of two abutments 27 and 28, abutment 27 being fixed in position with respect to the shutter being fastened to plate 8, and abutment 128 being movable as a part of the master member 9.

The possibility of an inaccuracy in the stroke of the latch member 20 is obviated by means of the guide member 31. After the movement is once started, either for the setting of the shutter or for making an exposure, the latch 22 cannot be altered with respect to the pin 6, because throughout practically all of the setting movement the latch rides over the top of guide member 31, and throughout practically all of the shutter operating stroke the latch rides beneath the guiding member 31.

While the parts in the drawing are shown to be comparatively heavy, in actual practice they are quite light and in a large sized shutter, such as that known as the 3A or post card size, the parts are approximately half the size of those shown in the drawings. It will thus be seen that they offer very little resistance to be overcome by the master member spring 12, and that as there is only just sufficient friction at the pivotal connection 21 between the latch 20 and link 16 to hold the latch in its set position that these parts move quite freely.

Having thus described my invention, what I claim as new and desire to secure by Letters Patent is:

1. In a photographic shutter, the combination with blade mechanism including a blade controlling connection movable in one direction to open the blades and in an opposite direction to close them, of a master member, an actuating link connecting the blade controlling connection and the master member, said actuating link being pivotally attached to the master member and having a lost motion connection with the controlling connection and a latch pivotally mounted on the link for preventing lost motion on predetermined actuations of the link.

2. In a photographic shutter, the combination with blade mechanism including a blade controlling connection movable in one direction to open the blades and in an opposite direction to close them, of a master member, an actuating link connecting the blade controlling connection and the master member, said actuating link being pivotally attached to the master member and having a lost motion connection with the controlling connection and a latch pivotally mounted on the link and being adapted to prevent or permit lost motion at the lost motion connection, and means for positioning the latch on the link.

3. In a photographic shutter, the combination with blade mechanism including a blade controlling connection movable in one direction to open the blades and in an opposite direction to close them, of a master member, an actuating link connecting the blade controlling connection and the master member, said actuating link being pivotally attached to the master member and having a lost motion connection with the controlling connection, and a latch pivotally mounted on the link and being adapted to prevent or permit lost motion at the lost motion connection, and means for positioning the latch on the link, said means comprising abutments, one carried by the shutter and the other by the master member.

4. In a photographic shutter, the combination with blade mechanism including a blade controlling connection movable in one direction to open the blades and in an opposite direction to close them, of a master member, an actuating link connecting the blade controlling connection and the master member, said actuating link being pivotally attached to the master member and having a lost motion connection with the controlling connection, and a latch pivotally mounted on the link and being adapted to prevent or permit lost motion at the lost motion connection, two positioning abutments adapted to be engaged by the latch through movement of the link and master member, whereby said latch may prevent lost motion on certain actuations of the link.

5. In a photographic shutter, the combination with a blade mechanism including a blade controlling connection movable in one direction to open the blades and in an opposite direction to close them, of a master member, connections between the master member and blade controller including a link pivotally connected to the master member and having a lost motion connection with the blade controller, a latch and abutments for operating the latch to eliminate the lost motion in the connection between the blades and controller.

6. In a photographic shutter, the combination with a blade mechanism including a blade controlling connection movable in one direction to open the blades and in an opposite direction to close them, of a master member, connections between the master member and blade controller including a link pivotally connected to the master member and having a lost motion connection with the blade controller, a latch, a fixed abutment and a movable abutment carried by the master member, said latch being positioned to engage one abutment when the link is moved in one direction by the master member.

7. In a photographic shutter, the combination with a blade mechanism including a blade controlling connection movable in one direction to open the blades and in an opposite direction to close them, of a master member, connections between the master member and blade controller including a link pivotally connected to the master member and having a lost motion connection with the blade controller, a latch, a fixed abutment and a movable abutment carried by the master member, said latch being positioned to engage one abutment when the link is moved in one direction by the master member and being positioned to engage the other abutment when the link is moved in an opposite direction by the master member.

8. In a photographic shutter, the combination with a blade mechanism including a blade controlling connection movable in one direction to open the blades and in an opposite direction to close them, of a master member, connections between the master member and blade controller including a link pivotally connected to one part and having a lost motion connection with the other part, a latch for eliminating lost motion at the lost motion connection carried by the link, and a latch guide for determining the course of the latch through the greater part of the movement of the latch as it is moved on the link by the master member.

9. In a photographic shutter, the combination with a blade mechanism including a blade controlling connection movable in one direction to open the blades and in an opposite direction to close them, of a master member, connections between the master member and blade controller including a link pivotally connected to one part and having a lost motion connection with the other part, a latch for eliminating lost motion at the lost motion connection carried by the link, and a latch guide for guiding the latch through one of two paths as the link is moved, one path of movement causing the latch to prevent lost motion at the lost motion connection.

10. In a photographic shutter, the combination with a blade mechanism including a blade controlling connection movable in one direction to open the blades and in an opposite direction to close them, of a master member, connections between the master member and blade controller including a link pivotally connected to one part and having a lost motion connection with the other part, a latch for eliminating lost motion at the lost motion connection carried by the link, and a latch guide for guiding the latch through one of two paths as the link is moved, one path of movement causing the latch to prevent lost motion at the lost motion connection, and an abutment for causing the latch to contact with the latch guide.

11. In a photographic shutter, the combination with a blade mechanism including a blade controlling connection movable in one direction to open the blades and in an opposite direction to close them, of a master member, connections between the master member and blade controller including a link pivotally connected to one part and having a lost motion connection with the other part, a latch for eliminating lost motion at the lost motion connection carried by the link, and a latch guide having two guideways adapted to engage the latch, one for holding the latch in position to eliminate lost motion at the lost motion connection and the other for holding the latch from this position, and abutments for directing the latch with engagement with the latch guiding guideways.

12. In a photographic shutter, the combination with a blade mechanism including a blade controlling connection movable in one direction to open the blades and in an opposite direction to close them, of a master member, connections between the master member and blade controller including a link pivotally connected to one part and having a lost motion connection with the other part, a latch for eliminating lost motion at the lost motion connection carried by the link, and a latch guide having two guideways adapted to engage the latch, one for holding the latch in position to eliminate lost motion at the lost motion connection, and the other for holding the latch from this position, and abutments for directing the latch into engagement with alternate guideways of the latch guideway.

Signed at Rochester, New York, this 7th day of February, 1929.

WILLIAM A. RIDDELL.